US012063317B2

(12) United States Patent
Ni et al.

(10) Patent No.: US 12,063,317 B2
(45) Date of Patent: *Aug. 13, 2024

(54) SUMMARILY CONVEYING SMART APPLIANCE STATUSES

(71) Applicant: Google LLC, Mountain View, CA (US)

(72) Inventors: Yuzhao Ni, Sunnyvale, CA (US);
Ashwin Limaye, Sunnyvale, CA (US);
Cindy Tran, Sunnyvale, CA (US);
Thomas Clifton, Seattle, WA (US);
David Roy Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/484,202

(22) Filed: Sep. 24, 2021

(65) Prior Publication Data

US 2022/0014413 A1     Jan. 13, 2022

Related U.S. Application Data

(63) Continuation of application No. 16/971,542, filed as application No. PCT/US2019/055149 on Oct. 8, 2019, now Pat. No. 11,177,044.

(Continued)

(51) Int. Cl.
*H04L 67/12* (2022.01)
*G10L 15/22* (2006.01)
(Continued)

(52) U.S. Cl.
CPC .............. *H04L 9/40* (2022.05); *G10L 15/22* (2013.01); *G16Y 10/80* (2020.01); *G16Y 20/20* (2020.01);
(Continued)

(58) Field of Classification Search
CPC . H04L 9/40; H04L 67/12; G10L 15/22; G10L 13/08; G16Y 10/80; G16Y 20/20;
(Continued)

(56) References Cited

U.S. PATENT DOCUMENTS 8,370,288 B2    2/2013   Harris
10,409,551 B1   9/2019   Waugh
(Continued)

FOREIGN PATENT DOCUMENTS

CN     105247428     1/2016
CN     106461412     2/2017
(Continued)

OTHER PUBLICATIONS

European Patent Office; Extended European Search Report issued in Application No. 22162450.5, 12 pages, dated Jun. 14, 2022.
(Continued)

*Primary Examiner* — Alina A Boutah
(74) *Attorney, Agent, or Firm* — Gray Ice Higdon (57) ABSTRACT

Implementing methods to provide a shortened textual summary that includes status information that is most pertinent to the user for a plurality of connected smart devices. The method includes determining a list of current statuses for a plurality of enabled smart devices and filtering the list to remove statuses that may not be of interest to the user. The filtering of the list is based on a current context of the requesting user and one or more previous contexts of the user. The resulting filtered statuses are then converted to textual snippets, summarized, and provided to the user via one or more output devices.

20 Claims, 7 Drawing Sheets

Related U.S. Application Data (60) Provisional application No. 62/742,585, filed on Oct. 8, 2018.

(51) Int. Cl.
| | | |
|---|---|---|
| *G16Y 10/80* | (2020.01) | |
| *G16Y 20/20* | (2020.01) | |
| *G16Y 20/40* | (2020.01) | |
| *G16Y 40/10* | (2020.01) | |
| *G16Y 40/35* | (2020.01) | |
| *H04L 9/40* | (2022.01) | |

(52) U.S. Cl.
CPC .............. *G16Y 20/40* (2020.01); *G16Y 40/10* (2020.01); *G16Y 40/35* (2020.01); *H04L 67/12* (2013.01)

(58) Field of Classification Search
CPC ........ G16Y 20/40; G16Y 40/10; G16Y 40/35; G05B 2219/2642; G05B 15/02
See application file for complete search history.

(56) References Cited

U.S. PATENT DOCUMENTS

| | | | |
|---|---|---|---|
| 10,490,195 | B1 | 11/2019 | Krishnamoorthy et al. |
| 10,885,091 | B1 | 1/2021 | Meng et al. |
| 2012/0210203 | A1 | 8/2012 | Kandekar et al. |
| 2014/0241354 | A1 | 8/2014 | Shuman et al. |
| 2014/0244001 | A1 | 8/2014 | Glickfield et al. |
| 2015/0074582 | A1* | 3/2015 | Shearer ................. G06F 3/0481 715/771 |
| 2015/0082225 | A1 | 3/2015 | Shearer |
| 2015/0249672 | A1 | 9/2015 | Burns et al. |
| 2015/0348554 | A1 | 12/2015 | Orr et al. |
| 2016/0225372 | A1* | 8/2016 | Cheung ................... G06F 3/167 |
| 2016/0357163 | A1 | 12/2016 | Marti et al. |
| 2016/0378080 | A1 | 12/2016 | Uppala et al. |
| 2019/0095524 | A1* | 3/2019 | Rodgers ................. G10L 15/22 |

FOREIGN PATENT DOCUMENTS

| | | |
|---|---|---|
| CN | 107078930 | 8/2017 |
| EP | 2738478 | 6/2014 |
| JP | 2003091298 | 3/2003 |
| JP | 2019507973 | 3/2019 |
| KR | 101511831 | 4/2015 |
| WO | 2017007723 | 1/2017 |
| WO | 2020076795 | 4/2020 |

OTHER PUBLICATIONS

Korean Intellectual Property Office; Notice of Office Action issued in Application Ser. No. KR10-2020-7035935; 7 pages; dated May 31, 2022.

Korean Intellectual Property Office; Notice of Allowance issued in Application Ser. No. KR10-2020-7035935; 5 pages; dated Nov. 9, 2022.

Dey, S. et al.; DNN Based Speaker Embedding Using Content Information for Text-Dependent Speaker Verification; 5 pages; dated 2018.

European Patent Office; Invitation to Pay Additional Fees issued in Ser. No. PCT/US2019/055149; 17 pages; dated Jan. 22, 2020.

European Patent Office; International Search Report and Written Opinion issued in Ser. No. PCT/US2019/055149; 19 pages; dated Apr. 6, 2020.

Things That Are Smart Wiki; "Ask Alexa—Voice Reports;" retrieved from internet: http://thingsthataresmart.wiki/index.php?title=Ask_Alexa_-_Voice_Reports&oldid=12348; 6 pages; last edited on Mar. 18, 2018.

Intellectual Property India; Examination Report issued in Application No. 202228008033; 6 pages; dated Jan. 11, 2023.

European Patent Office; Communication under Rule 71(3) EPC issued in Application No. 19794805.2; 48 pages; dated Nov. 11, 2021.

Japanese Patent Office; Notice of Allowance of Application No. 2020-569826; 3 pages; dated Sep. 21, 2021 2.

Intellectual Property India; Hearing Notice issued in Application No. 202027053827, 2 pages, dated Nov. 29, 2023.

China National Intellectual Property Administration; Notification of First Office Action issued in Application No. 201980043441.0, 24 pages, dated Dec. 22, 2023.

Intellectual Property India; Hearing Notice issued in Application No. 202228008033; 3 pages; dated May 16, 2024.

European Patent Office; Intention to Grant issued in Application No. 22162450.5; 50 pages; dated May 7, 2024.

China National Intellectual Property Administration; Grant Notice issued in Application No. 201980043441.0, 6 pages, dated Jun. 3, 2024.

* cited by examiner

SUMMARILY CONVEYING SMART APPLIANCE STATUSES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. Automated assistants may perform various types of processing on the natural language input, such as natural language processing, syntactic processing, semantic processing, etc., in order to identify and respond to the user's intent. Computing devices configured primarily or exclusively for engagement with automated assistants, such as many standalone interactive speakers available today, may be referred to herein as "assistant devices."

One common use of automated assistants is to control smart devices. "Smart devices" as used herein refers to devices and/or appliances that configured for network communication (e.g., via Wi-Fi, ZigBee, Z-Wave, Bluetooth, etc.), and hence are remotely controllable using computing devices such as assistant devices, smart phones, etc. Smart devices may include, but are not limited to, smart locks, smart lights, smart thermostats, alarm systems, smart cameras, smart garage door openers, smart electrical outlets, smart faucets, smart sprinkler systems, smart kitchen appliances (e.g., ovens, coffee makers, refrigerators), smart blinds, smart windows, and any other networked appliance that is controllable remotely using a computing device.

As more smart devices are installed throughout homes and workplaces, managing those devices becomes more complex. As an example, suppose a user desires to know a statuses of all (or some portion of) smart devices in her home. The user may submit a natural language input request to an automated assistant to provide information about the current statuses of smart devices that are controllable via the automated assistant. The automated assistant may provide an audible or visual recitation of all devices currently in communication with the automated assistant. For example, the statuses of the devices may be provided along with a name and/or alias for each device (e.g., "Lamp one is on, lamp two is at fifty percent, door one is currently locked," etc.). However, as more smart devices are enabled and in communication with the automated assistant, the audible or visual listing of the statuses of all connected devices may become lengthy. Further, some of the smart device statuses may not be of interest to the user. For example, the user at home may not be interested in hearing statuses of smart lights in the same room as the user (which would be evident by simply looking at the lights themselves), or that the smart alarm system is currently disengaged. Thus, a comprehensive recitation of all smart device statuses may not be useful to the user.

Additionally, verifying and conveying the status of numerous devices requires spending computational resources that may not result in the user being provided with useful information in a given instance. Further, merely reciting a multitude of device statuses may not allow the user to reengage in a dialog with the automated assistant in a meaningful manner because, as the recited information increases, the user may be unlikely or unable to respond to the status messages with additional queries and/or commands.

SUMMARY

Implementations are described herein for generating and providing a textual summary about statuses of smart devices that includes and/or promotes status information that is most pertinent to the user for a plurality of connected smart devices, while omitting or demoting less relevant smart device status information. In some implementations, a list of current statuses for a plurality of enabled smart devices may be determined and filtered to remove statuses that may not be of interest to the user. The filtering of the list may be based on a current context of the requesting user and/or one or more previous contexts of the user. The resulting filtered statuses may then be converted to textual snippets, summarized, and provided to the user via one or more output devices. Closely related techniques are also described herein for summarizing smart device statuses based on types of smart devices and past user commands or requests issued to smart devices in particular contexts.

As an example, a user may provide to an automated assistant a request of "What is the current status of the house?" A list of current statuses is determined for smart devices that are associated with the system, such as lights, appliances, alarm systems, door locks, and/or other devices that may be controlled and/or monitored by the system. Based on a current user context, one or more of the statuses may be filtered out, such as devices that always have the same status (e.g., always "on"), devices that are not likely of interest to the user in the user's current context (e.g., time of day), and so forth.

Once the statuses have been filtered, textual snippets may be generated for the remaining device statuses. For example, for a smart lighting fixture, a status of "Name="Kitchen Light" Status="Off" may be provided by a third-party controller of the lighting fixture. A textual snippet of "The kitchen light is off" may be generated for the status, which then may be provided to the user as part of a home status update. As another example, an interface for a smart lock may provide a status of "Back door unlocked" and a textual snippet of "The back door is unlocked" may be generated for the device.

Textual snippets can then be organized and summarized to provide an abbreviated status report to the user. The summarization may include, for example, combining textual snippets for devices of the same type and status into general statuses, combining devices in particular locations into groupings of devices, and/or other summarizations that allow the status of multiple devices to be provided to the user without necessarily listing all devices. As an example, textual snippets for all lights may be summarized into a status of "Lights 1, 2, and 3 are on . . . The rest of the lights are off" based on grouping the "on" lights into one summary and grouping the remaining lights into a second "off" grouping. Also, for example, a textual summary of "Everything is off in the kitchen" may be generated from the textual snippets of all devices in a room (i.e., a "kitchen" room) having a status of "off." Thus, the user is not provided with a separate status for each device but is instead provided with summaries of statuses, which in some cases may include only statuses that are different and/or unusual for a particular situation.

In some implementations, the summarizations of the textual snippets are provided to the user via one or more output devices. In some implementations, the output device may provide an audio status report that summarizes one or more devices that are associated with the assistant. In some implementations, a visual summary may be provided as a summarization of the status of one or more devices, such as via a graphical user interface. In some implementations, both an audio and visual summary can be provided to the user via one or more output devices.

In some implementations, additional interface information can be provided to the user with the summarization. For example, a user may be provided a summary of devices graphically and additionally can be provided with an interface to change the status of one or more devices. This may include providing an option to change a device that is different than other devices (e.g., a status of "All of the downstairs lights are off except the kitchen light. Would you like to turn it off?") and/or providing an interface that allows the user to visually identify devices that have different statuses and change one or more of the statuses. In some implementations, in the visually-provided textual summary, various tokens that describe a particular smart device may be presented as selectable links. A user may select these links to be provided an interface for controlling that smart device. In some implementations, the user may be provided with an audio summary that indicates one or more devices that are not in an expected status and additionally be provided with a prompt to change a status of the device (e.g., "The back door is not currently locked. Would you like to lock it" provided if the user checks the status of devices at a time that is typically the end of the night for the user).

The above is provided as an overview of some implementations disclosed herein. Further description of these and other implementations is provided below.

In some implementations, a method performed by one or more processors is provided that includes: determining a list of current statuses of a plurality of smart devices controlled by a user; determining a current user context based on one or more contextual signals generated by one or more computing devices controlled by the user; identifying, from a plurality of past user contexts, one or more comparable past user contexts that are comparable to the current user context; for each of the one or more comparable past user contexts, obtaining a corresponding list of past statuses of the plurality of smart devices; filtering the list of current statuses to remove one or more of the current statuses and generate a filtered list of current statuses, wherein the filtering is based on a comparison of the list of current statuses with the one or more lists of past statuses; generating one or more textual snippets based on the filtered list of current statuses; generating a textual summary of the one or more textual snippets; and providing the textual summary at an output device of one or more of the computing devices controlled by the user.

In various implementations, the filtering may include removing, from the list of current statuses, one or more of the current statuses that match corresponding past statuses from the list of past statuses. In various implementations, the filtered list of current statuses may include current statuses from the list of current statuses that deviate from the list of past statuses.

In various implementations, the method may further include organizing one or more of the statuses of the filtered list into a grouping based on similarity between current statuses of the smart devices of the group. In various implementations, generating the textual summary may include generating a textual clause for the grouping.

In various implementations, the output device may provide the user with the textual summary via audio. In various implementations, the method may further include providing an audio prompt indicating one or more of the smart devices and an offer to change the status of the indicated smart device. In various implementations, the output device may include a visual display.

In various implementations, the method may further include providing a control interface to the user to allow the user to adjust the status of at least one of the smart devices. In various implementations, the method may further include receiving, in response to providing the control interface, an indication from the user to adjust the status of at least one of the smart devices; and providing the indication to the at least one smart device.

In various implementations, the method may further include receiving a request from the user via an input device of the one or more of the computing devices, wherein the input device is associated with a location. In various implementations, the current user context may be determined based at least in part on the location. In various implementations, filtering the list of current statuses may include filtering out one or more statuses that are associated with the location. In various implementations, the current user context may be determined based at least in part on a current time of day.

In various implementations, the method may further include receiving, at one or more microphones of one or more of the computing devices, an audio input from the user; identifying audio profiles of a plurality of users; and determining an identity of the user based on the audio input and the audio profiles. In various implementations, the one or more past user contexts may be associated with the determined identity. In various implementations, the method may further include storing the current user context with the plurality of past user contexts.

In another aspect, a computer-implemented method may include determining a list of current statuses of a plurality of smart devices controlled by a user; organizing the list of current statuses of the plurality of smart devices into groups of smart devices by device types of the smart devices; generating a device type textual snippet for one or more of the groups of smart devices; generating a textual summary of the one or more device type textual snippets; and providing the textual summary at an output device of one or more computing devices controlled by the user.

In yet another aspect, a computer-implemented method may include determining a list of current statuses of a plurality of smart devices controlled by a user; determining a current user context based on one or more contextual signals generated by one or more computing devices controlled by the user; identifying one or more past user contexts that are comparable to the current user context; identifying one or more requests or commands issued by the user in association with controlling one or more of the plurality of smart devices, wherein the one or more requests or commands were issued by the user while the user was in the one or more past user contexts; filtering the list of current statuses to remove one or more of the current statuses and generate a filtered list of current statuses, wherein the filtering is based at least in part on the identified one or more requests or commands; generating one or more textual snippets based on the filtered list of current statuses; generating a textual summary of the one or more textual snippets; and providing the textual summary at an output device of one or more of the computing devices controlled by the user.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
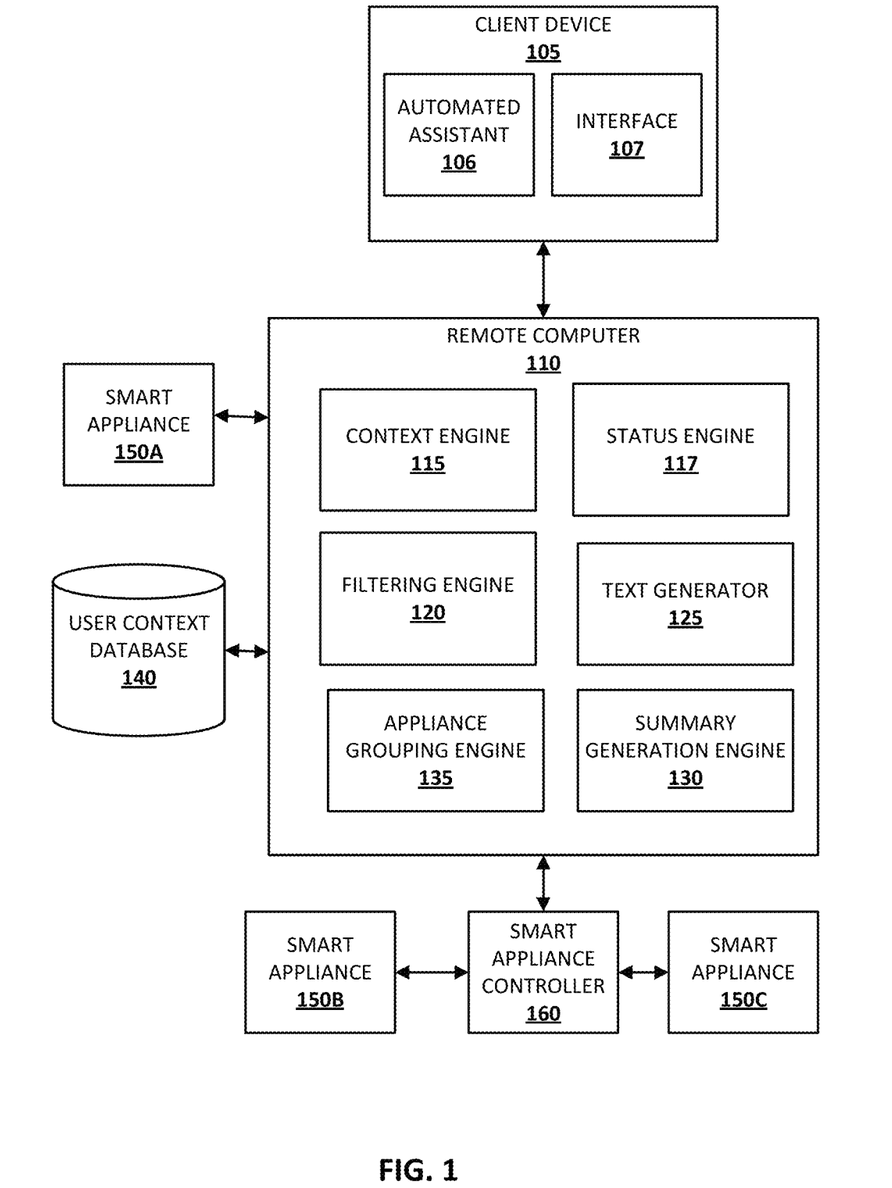
FIG. 1 is a block diagram of an example environment in which implementations disclosed herein can be implemented.

Now turning to FIG. 1, an example environment in which techniques disclosed herein can be implemented is illustrated. The example environment includes a client device 105 and a remote computer 110. Although both the client device 105 and the remote computer 110 are each illustrated in FIG. 1 as single components, it is understood that one or more modules and/or aspects of either can be implemented, in whole or in part, by one or more other devices. For example, in some implementations a first set of modules and/or aspects are implemented by one or more processors of a first remote system, and a second set of modules and/or aspects are implemented by one or more processors of one or more separate remote server device(s) that are in network communication with the remote computer 110. The remote server device(s) can be, for example, a cluster of high performance remote server device(s) that handle requests from one or more client devices, as well as requests from additional devices.

Client device 105 may be a mobile phone computing device, a tablet computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client devices may be provided. Further, one or more components of client device 105 may be implemented on separate devices. For example, automated assistant 106 and/or interface 107 may be implemented on one or more alternate computing devices that are in communication with client device 105. Components of client device 105 and components of remote computer 110 can communicate via a communication network. The communication network may include, for example, a wide area network (WAN) (e.g., the Internet). Further, components of client device 105 may communicate with one or more other components via a communication network. For example, communication network may include a local area network (LAN) and/or BLUETOOTH and may communicate with one or more other devices via the LAN and/or BLUETOOTH (e.g., an automated assistant device communicating with a handheld computing device of a user).

In some implementations, client device 105 can include a microphone that allows the user to provide natural language input to one or more modules of the client device 105, such as automated assistant 106. The audio data may be received by the microphone and automated assistant 106 may process the audio to generate text and/or other audio data that may be further processed by one or more modules of the client device 105 and/or provided via network communication to remote computer 110 for further processing. For example, client device may include a speech to text ("STT") module (not depicted) configured to process captured audio into text to provide to remote computer 110. Additionally or alternatively, audio data (or other data indicative thereof, such as a latent space embedding generated from the audio data) may be provided to remote computer 110 directly, which may include a STT module (not depicted) for further processing of the audio data.

Automated assistant 106 can process natural language input of a user and provide responses in the form of a dialog that includes a plurality of dialog turns. A dialog turn may include a response to natural language input of the user, followed by the user submitted additional natural language input. Thus, a dialog between the user and the automated assistant 106 can be generated that allows the user to interact with the automated assistant 106 in a conversational manner. As an example, the user may submit natural language input of "What are the current statuses of my devices" to the automated assistant 106. The automated assistant 106 may process the natural language input and provide the input to one or more other modules for further processing.

In some implementations, a user may interact with remote computer 110 and/or automated assistant 106 via one or more interfaces, such as interface 107. For example, interface 107 may be a graphical interface and allow the user, via clickable icons and/or other graphical elements, to indicate an interest in being provided with device status information as described herein. In some implementations, the interface 107 may be implemented on a different device than the device by which the user submits an audio request. For example, the user may utilize a first device to provide an audio request for a summary of devices, and the user may be provided with a summary and/or other information via an interface 107 of a second device. In some implementations, the interface 107 may include a speaker and/or microphone and the user may be provided with a device summary as speech. Thus, automated assistant 106 and/or interface 107 can further include may include a text to speech ("TTS") module (not depicted) that converts a device summary to speech and renders the speech via a speaker of the client device 105. Subsequently, the user can submit additional natural language input to the automated assistant 106 to continue a dialog with the automated assistant 106 and/or utilize the interface 107 to provide one or more modules with additional requests, such as a request to adjust the status of one or more devices.

Remote computer 110 is in communication with one or more smart devices, either directly to the smart device, such as 150A, or via a smart device controller 160, which controls and/or monitors one or more smart devices 150B and 150C. As noted previously, smart devices may include, for example, lighting devices, appliances, thermostats, electrical outlets, electronic devices, and/or other devices that include components to communicate with remote devices (e.g., devices with a Wi-Fi communication component). Further, smart devices 150A, 150B, and 150C may be remotely operable over one or more computing networks (not depicted) and/or may allow for changes in the status of one or more aspects of the smart device 150 via remote communication.

As an example, smart device 150A may be a smart lighting fixture that can provide a status to one or more remote components, such as remote computer 110, via one or more communication channels (e.g., Wi-Fi, Bluetooth, ZigBee, Z-Wave, etc.). Further, a user may, via one or more other components in communication with remote computer 110, change a status of the lighting fixture. For example, a user may utilize automated assistant 106 to submit a request, via remote computer 110, to change the status of the smart device 150A (e.g., turn on the device, turn off the device, change the intensity and/or color of light emitted by the device). Also, for example, remote computer 110 may be in communication with a controller 160 that controls a plurality of smart devices. For example, smart controller 160 may be a communication hub of a third party system that provides control signals to devices manufactured by that third party and/or polls and provides status indications for devices in communication with that controller 160 (e.g., all devices manufactured by Company A may be in communication with a first controller, all devices manufactured by Company B may be in communication with a second controller).

The smart devices 150A and/or smart device controller 160 may be configured to provide an indication of the current status of the smart device 150A or the smart devices 150B and 150C in communication with the smart device controller 160. A status may include an identifier of a particular device, such as an alias for the smart device assigned by the user, and an indication of a status or state. As an example, a user may configure a smart lighting fixture by assigning the fixture an alias of "Kitchen Light." The lighting fixture can provide a status to remote computer 110 that indicates the alias and status, such as "NAME=kitchen_light STATUS=on" to indicate that the fixture with an alias of "kitchen_light" is currently on. Also, for example, statuses may be unique to the type of smart device and a device may have one or more statuses associated with the device. For example, a smart device 150A that is an oven may include one or more statuses, such as a current oven temperature, the status of one or more lighting fixtures of the oven, and/or the current time on a timer, and/or the operational status of an exhaust fan.

Status engine 117 determines a list of current statuses of smart devices that are controlled by a user. In some implementations, smart devices 150A and/or device controllers 160 may periodically provide a status for one or more smart devices. For example, device controller 160 may provide current statuses of all associated smart devices associated with the controller 160 every minute, every 5 minutes, every 10 seconds, etc. In some implementations, a smart device 150A and/or device controller 160 may provide a status update any time a smart device has a change in a status. For example, for a lighting fixture associated with the controller 160, the controller 160 may provide a status update of the current status of the fixture whenever the lighting intensity of the fixture is changed (e.g., the fixture is turned on, turned off, the intensity is changed). In some implementations, status engine 117 may provide a request to connected devices for their current statuses. Alternatively, the smart devices 150 and/or controller 160 may asynchronously provide the current smart device statuses on a periodic basis, when one or more smart device statuses changes, on request, etc.

Context engine 115 determines a current user context of the user based on one or more contextual signals generated by computing devices of the user. A current user context is an indication of the current state of the user. Attributes of a user's context—which may be determined and/or generated by one or more computing devices controlled by the user—may include, but are not limited to, a time of day, the user's location, the user's schedule (e.g., does the user's calendar indicate that she is currently engaged in an activity?), the user's social networking status, one or more computer applications currently being engaged with by the user, media currently being consumed by the user, and so forth.

In various implementations, a user's context may be utilized to determine which devices the user most likely has interest in being provided in a smart device summary. For example, a user may have more interest in particular smart devices based on the location of the user, the time of day, and/or one or more other attributes of the user's context that may be indicative of the current interest of the user in requesting a device summary. Thus, based on a current context of a user, one or more smart device statuses may be filtered from a list of current smart device statuses based on likelihood that the user does not have interest in those filtered devices while in the current user context.

In some implementations, a current user context may include a current time of day. For example, a user may utilize client device 105 to provide a request to be provided with a device summary and the current user context may include the time of day that the user has provided the request. Based on the time of day, the user may likely have interest in different smart devices than at other times of the day. For example, if the user submits a request at the end of the day, the user may more likely have interest in being provided with a status of smart locks (e.g., to ensure that the doors are locked) and/or the status of a smart oven (e.g., to ensure that the oven is not currently on) than the status of bedroom lighting fixtures (e.g., where the user is likely to be located or will be located shortly). Thus, a time of day may be utilized by one or more other components to filter one or more device signals, as further described herein.

In some implementations, a current user context may be associated with a current location of the user and/or the device that the user has utilized to provide a request for a device summary. For example, a location may be associated with client device 105, and the location of the client device 105 may be indicative of the location of the user when the user submits a request via client device 105. A user context that includes a location may then be utilized to filter one or more devices statuses from a device summary. For example, lighting units in the room occupied by the user may be filtered out, whereas other lighting units that are not readily visible to the user may have their statuses summarized.

In some implementations, a list of current statuses and a current user context of the user may be stored in user context database 140. User context database 140 includes a context of a user, including one or more of the contextual attributes described previously, and the statuses of smart devices. In some implementations, the user context and the devices statuses may be stored in the user context database 140 when the user submits a device summary request. In some implementations, a user context and device statuses may be stored in the user context database 140 when the user updates the status of one or more devices. For example, a user context and devices statuses may be stored in the user context database 140 when the user turns on a lighting fixture and/or checks the status of the lighting fixture.

Once a current user context has been determined, context engine 115 identifies one or more past contexts of the user that are comparable to the current user context. Two user contexts may be comparable (or "match" each other) if they are sufficiently similar. For example, in some implementations, user contexts may be defined as feature vectors (which may or may not be embedded into latent space), and similarities and/or distances between these feature vectors may be determined and/or computed, e.g., as a similarity measure. In some such implementations, if the similarity measure between two (or more) user contexts satisfies some threshold), those two contexts may be considered comparable. Additionally or alternatively, in other implementations, user contexts may be deemed comparable based on other criteria and/or heuristics, such as both time-of-day and location being sufficiently similar or even identical, respective times-of-day being within n minutes of each other, respective user locations being within m distance units (e.g., feet, meters, etc.) from each other, etc.

Past contexts of the user may be stored in a database that shares one or more characteristics with user context database 140, as described herein, and may be utilized to determine a list of past statuses of the smart devices of the user. For example, context engine 115 may identify that the user has submitted a request for a device summary at 10 p.m., and context engine 115 may further identify entries in user context database 140 for past user contexts that are temporally proximate to the current time (e.g., past user contexts with an hour of the current time). Also, for example, a current user context of a location may be utilized to identify entries in the user context database 140 that include past user contexts of the same location. Based on identifying past user contexts in the context database 140 that are comparable to the current user context, a list of past statuses may be identified.

As an example, a user may adjust a thermostat every morning before leaving home. Each time the user adjusts the thermostat, an entry may be stored in the user context database 140 to indicate the user context (i.e., the time of day) and the thermostat temperature (i.e., smart device status). Subsequently, a user may submit a request to be provided with a device status summary at 10 a.m. and context engine 115 may identify "morning" or the current time as the current user context, identify the entries in the user context database 140 that are associated with the time and/or "morning," and further identify a list of past statuses of the thermostat.

Filtering engine 120 filters the list of current statuses to remove one or more of the current statuses and generates a filtered list of current statuses. In some implementations, filtering the list of current statuses may be based on a comparison between the list of past statuses identified from the user context database 140 and the current statuses of the smart devices. For example, a list of current statuses may be determined based on polling the smart devices and/or by receiving updates from the devices themselves (150) and/or device controllers (160), as described herein. The list of past statuses of the devices can be identified from the user context database 140 based on the current context of the user, as further described herein. Filtering engine 120 removes one or more of the current statuses from the list to limit the number of device statuses that are provided to the user in a summary. Thus, by limiting the number of provided statuses, less computation time is required to provide a device summary. For example, a user may have twenty smart devices which may include devices that are always in the same state, never utilized by the user, and/or of interest to the user only at particular times or in particular locations. By removing devices that are not likely of interest to a user while the user has a particular context, the user is not provided with unnecessary status information. Further, by not providing all twenty device statuses to the user in a summary, the user is more likely to utilize the device summary to provide additional input in a dialog with an automated assistant.

In some implementations, filtering the list of current statuses may include removing one or more of the current statuses that match the identified past status of the corresponding device. For example, a smart lighting fixture may have a current status of "on." Further, context engine 115 may identify a current user context of "morning" and further identify a past user context of "morning" in user context database 140 that is associated with a past status for the lighting fixture of "on." The list of current statuses may be filtered to remove the current status for that lighting fixture based on determining that the user is likely to already know that the lighting fixture has a status of "on" in the morning.

In some implementations, the filtered list of current statuses may include current statuses from the list of current statuses that deviate from the list of past statuses. Continuing with the same example, a lighting fixture that is identified as always "on" when the user context is "morning" may be included in the filtered list of current statuses if the current status of the device is "off." Thus, the filtered list can include current statuses of devices that may be unexpected given the current context of the user.

In some implementations, the filtered list of current statuses may be filtered based on a location of the user and/or a location of a device utilized by the user to submit a request for a device summary. As previously described, a user may submit a request to be provided a device status summary via a client device 105 that is associated with a location. The location may be utilized, in addition to the current user context, to filter one or more of the current statuses. As an example, a user may submit a request to be provided a device status summary via a client device 105 located in a "kitchen" room (i.e., associated with a "kitchen" room). Further, one or more of the devices with statuses in the current list may include a location with the status (e.g., Name="oven" Location="kitchen" Status="off"). The filtered list of current statuses may be filtered to remove one or more current statuses of devices that are further associated with the "kitchen" location. Thus, in some implementations, the user may not be provided with statuses of devices that may already be apparent to the user based on the user location.

In some implementations, the filtered list may be generated based on previous requests or commands issued by the user in associated with controlling the smart devices. Thus, in addition to identifying devices that the user has previously interacted with based on past user contexts, one or more statuses may be filtered from the list based on identifying that the user rarely or never interacts with one or more of the smart device. For example, a lighting fixture may always remain in an "on" state and that the user, in past interactions, has not changed the state of the device. The status of that lighting fixture may be removed from the list based on determining that the user either does not have interest in the device and/or already knows the status of the device. Further, in some implementations, the filtered list may be generated based on a time associated with one or more statuses. For example, a user may have recently interacted with a device and the status of that device may be removed from the list of statuses based on determining that the user likely already knows the status of the device.

Text generator 125 generates a text snippet for each of the current statuses that are included in the filtered list of statuses. A text snippet includes the information for a status in textual form that may be conveyed to a user. For example, for a status of "Name='bedroom light' Location='left' Status='Off'," text generator 125 may generate a text snippet of "The left bedroom light is off." Other examples of text snippets may include aliases of devices, locations, a numerical state (e.g., an oven with a temperature of "350 degrees," a lighting fixture with an intensity of "50%"), and/or other information that may be associated with a device and/or a device status.

Summary generation engine 130 may employ various textual summarization techniques, such as extractive methods, abstractive methods, deep learning using recurrent neural networks (RNN) (e.g., sequence-to-sequence learning, TensorFlow), etc., to generate a textual summary of the text snippets that are generated by the text generator 125 from the filtered list of devices statuses. Based on the text snippets, a textual summary is generated that includes pertinent information from the text snippets in a shortened form to be presented to the user. Generating a textual summary may include, for example, extracting key phrases from the snippets, summarizing multiple similar snippets into a single textual phrase, consolidating repetitive phrases and/or terms into single phrases, and/or other operations that shorten the length of the resulting textual summary while retaining the important information from the text snippets. For example, multiple textual snippets may be presented as respective clauses of a complete sentence.

As an example, text snippets of "Light 1 is off," "Light 2 is off," and "Light 3 is off" can be summarized into a textual summary of "Lights 1, 2, and 3 are off." Further, if those are the only text snippets (or the only snippets that are lights), a textual summary of "All lights are off" may be generated. Alternatively, if the text snippets further include a snippet of "Light 4 is on," a text summary of "Only Light 4 is on" and/or "All lights are off except Light 4" may be generated as a textual summary. In some implementations, a textual summary may include a plurality of phrases, each indicating a summarization of different device statuses included in the filtered list. Other examples of textual summaries include "All of the lights are off and the thermostat is set to 65," and "All of the downstairs lights are off except the kitchen light. The doors are unlocked."

In some implementations, remote computer 110 may further include a device grouping engine 135. Device grouping engine 135 can organize one or more of the current statuses of the filtered list into groupings based on the current statuses of the smart devices of the group, and/or based on device types of the smart devices (e.g., lighting, cooking, kitchen appliance, HVAC, etc.). For example, device grouping engine 135 may identify text snippets from a group of lighting devices and provide the text snippets as a group to summary generation engine 130 to generate one or more summary phrases. Also, for example, device grouping engine 135 may identify all devices that are in a location and provide the text snippets based on the statuses of the identified group to summary generation engine 130.

In some implementations, text generator 125 may generate a device type textual snippet for one or more of the groups determined by the device grouping engine 135. For example, device grouping engine 135 may generate a group that includes the current statuses of all lighting fixtures in the list and provide the group to text generator 125 to generate a text snippet for the group, such as "Light 1 is on. Light 2 is off. Light 3 is off" for a group that includes three lighting fixtures statuses. Summary generation engine 130 may then summarize the group text snippets into a summary of "Light 1 is on. The remaining lights are off" to provide to the user. In some implementations, text snippets may be generated for each of the statuses of a group separately and the snippets may be provided as a group directly to summary generation engine 130 to summarize. For example, text snippets of "The front door is locked" and "The back door is locked" may be generated by the text generator 125. Based on the text snippets, device grouping engine 135 may generate a device type grouping of the snippets and provide the text snippets to the device grouping engine 135, which may generate a summary of "The doors are locked."

In some implementations, a device type textual snippet may be generated based on determining a count of devices of the device type that have a particular status and generating a text snippet that includes a plurality of tokens, one of which is the count of devices with the particular status. For example, a group may include statuses and/or text snippets for four lighting devices, three of which indicate "on" as a status and one of which indicates "off" as a status. Text generator 125 may generate a text snippet that includes a token for each of the statuses of the devices of the group. For example, the text generator 125 may generate a text snippet of "Three lights are on, one is off" and/or "Light 1 is off and three lights are on."

Once a textual summary has been generated, summary generation engine 130 provides the summary to an output device of the user. In some implementations, the output device may share one or more characteristics with client device 105. For example, a textual summary may be provided to the user via an automated assistant 106 and/or via an interface 107, which may include both graphical and/or textual components.

Figure 2:
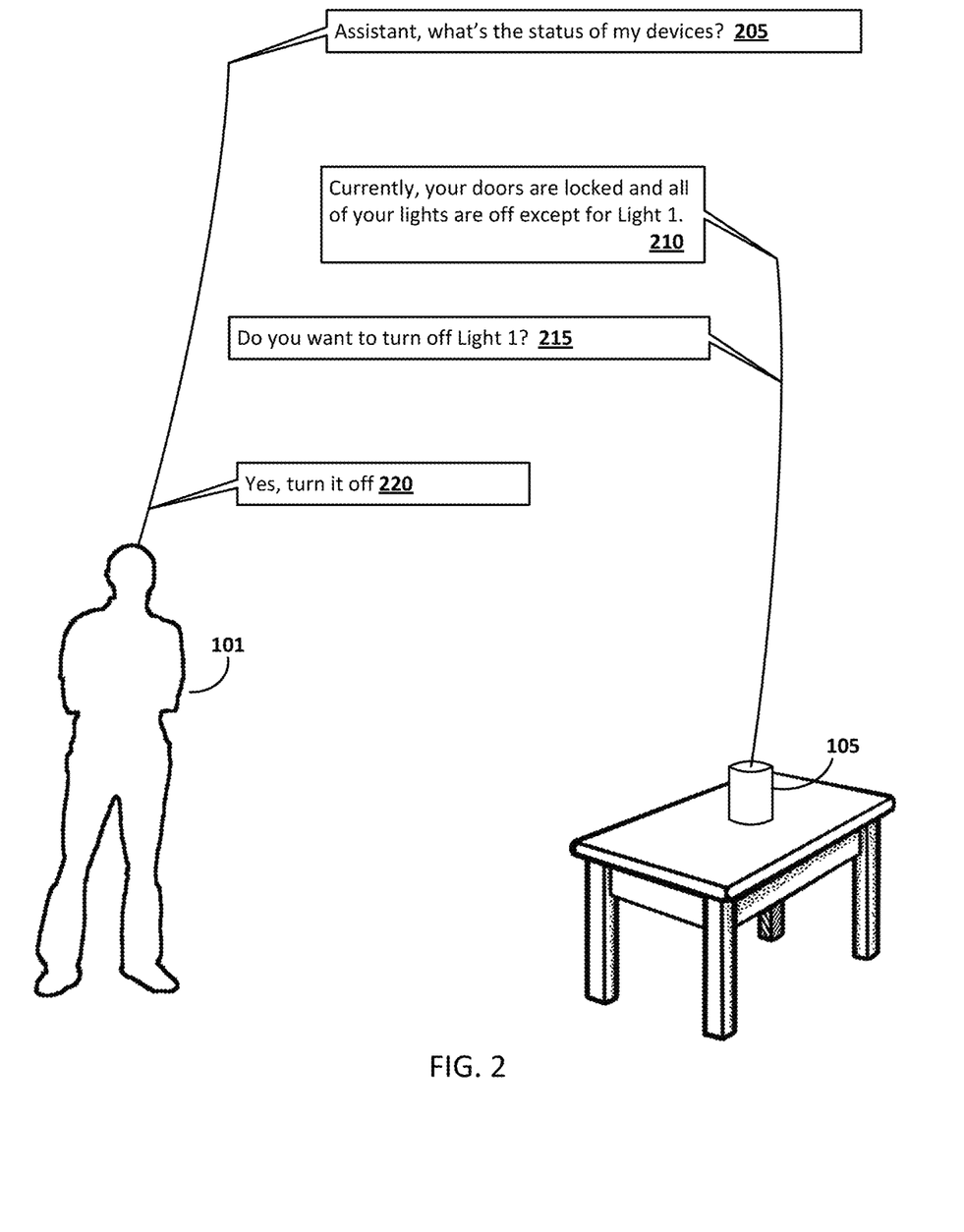
FIG. 2 illustrates an example dialog between a user and an automated assistant that includes providing a device summary to the user.

In some implementations, the textual summary may be provided to the user as audio. For example, one or more components of remote computer 110 and/or client device 105, such as automated assistant 106, may include a text-to-speech component that converts the textual summary into audio to provide to the user. Referring to FIG. 2, an example dialog between a client device 105 executing an automated assistant 106 and a user 101 is illustrated. At dialog turn 205, the user 101 provides a request for a device summary. The request is submitted to the remote computer 110, which determines a textual summary to provide to the user 101. At dialog turn 210, the textual summary is provided to the user 101.

In some implementations, a textual summary may be followed by additional audio that includes a solicitation for a response from the user to change the status of one or more of the smart devices. For example, referring again to FIG. 2, the automated assistant of client device 105 provides audio 215 that indicates the smart device from the dialog turn 210 that has a different status than the other devices (i.e., the device that is "on" while the other devices are "off") and includes an inquiry to the user to change the status of the smart device. Thus, the user provides a response 220 of "Yes, turn it off" which may be utilized by one or more components to change the status of the indicated smart device. For example, one or more components may resolve the "it" in response 215 to "Light 1" and a request of "Turn off light 1" may be provided to remote computer 110 for further processing.

Figure 3:
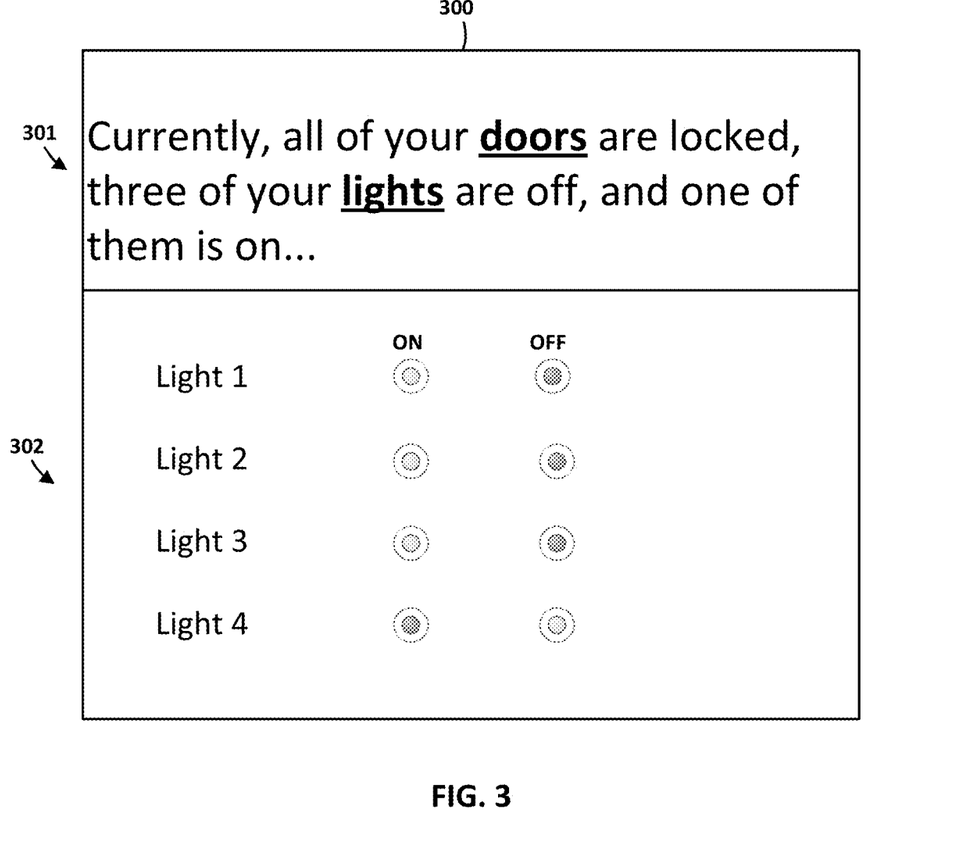
FIG. 3 illustrates an interface for an output device to graphically provide a device summary to a user.

In some implementations, the textual summary may be provided to the user graphically via interface 107. The textual summary may be provided via an interface that shares one or more characteristics with interface 107. For example, referring to FIG. 3, an example interface 300 is provided that illustrates providing a textual summary. The interface 300 includes the textual summary 301, as determined by summary generation engine 130 in textual format. In some implementations, interface 300 may be implemented by a device that further includes audio capabilities. For example, interface 300 may be executing on client device 105 that provides audio of the textual summary (similar to the device illustrated in FIG. 2) as well as a visual representation of the textual summary. For example, at 302, the user is presented with a graphical user interface that includes a list of lights and their statuses, which may be adjustable using the radio buttons. As another example, in the textual summary 301, the words "doors" and "lights" are emphasized with bold and underline to indicate that they are selectable to display respective graphical user interfaces, similar to 302, which the user may operate to control those components.

Referring again to FIG. 3, interface 300 includes a control interface 302. The control interface 302 includes interfaces for the devices that are included in the textual summary (i.e., Lights 1 to 4) as well as radio buttons to allow the user to change the statuses of any of the devices. As included in the textual summary, Lights 1 to 3 are currently set to a status of "off" and Light 4 is set to a status of "on." The user may select the radio button of any of the control interfaces to indicate that the status of the corresponding device should be changed, such as selecting the "off" radio button of Light 4 to turn off the device. In some implementations, the control interface 302 may include devices that are not included in the textual summary. For example, a user with 20 devices currently being controlled may be provided with a control interface that includes all of the devices, a selection of devices that includes more devices than the number included in the textual summary, and/or the same devices as included in the textual summary. In some implementations, the user selection may be utilized to adjust the status of one or more of the smart devices that are controlled by the user. The updated status may then be provided to the smart device, such as smart device 150A, and/or provided to a controller 160 of one or more smart devices.

In some implementations, multiple users may be associated with one or more input devices. Each of the user may be associated with one or more past user contexts and have different past interactions that can affect the filtering of the statuses by the filtering engine 120. Thus, in some implementations, one or more components may first receive audio data and/or other identifying data to determine which of a plurality of users is requesting a device summary before identifying corresponding past user contexts. For example, user context database 140 may include past user contexts for User 1 and User 2 that have been previously stored as described herein. When one of the users submits a spoken request to automated assistant 106 to be provided with a textual summary of the statuses of the devices, one or more components may first determine whether the request originated from User 1 or User 2, and subsequently identify only the past user contexts that correspond to the identified user.

Figure 4:
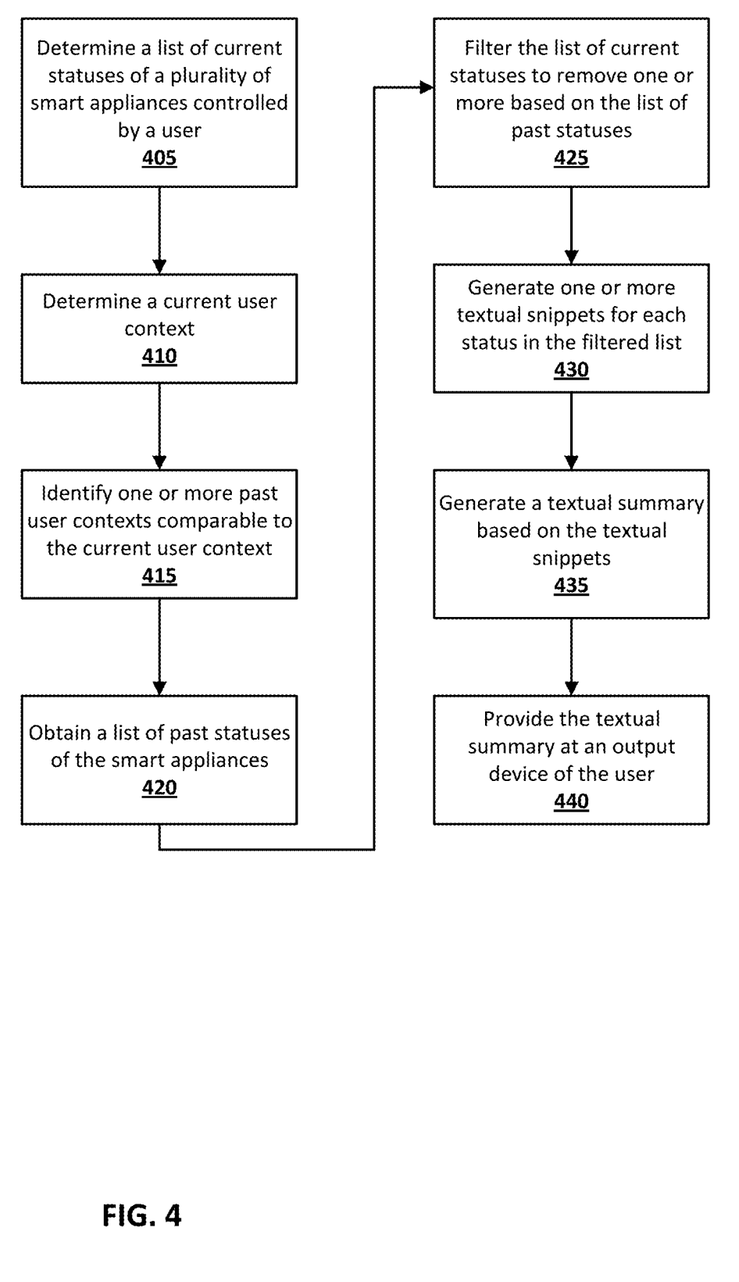
FIG. 4 illustrates a flowchart of an example method for practicing selected aspects of the present disclosure.

FIG. 4 illustrates a flowchart of an example method for providing a textual summary of the statuses of smart devices controlled by the user. The steps of FIG. 4 can be performed by one or more processors, such as one or more processors of a client device. Other implementations may include additional steps than those illustrated in FIG. 4, may perform step(s) of FIG. 4 in a different order and/or in parallel, and/or may omit one or more of the steps of FIG. 4.

At step 405, a list of current statuses of a plurality of smart devices controlled by a user is determined. The current statuses can be determined based on polling one or more of the smart devices and receiving statuses in response to the polling. In some implementations, one or more smart devices and/or controllers of the smart devices may periodically provide a status to one or more components that share characteristics with status engine 117. For example, one or more of smart device 150A and/or smart device controller 160 may provide a status every 10 seconds, once a minute, and/or any time the status of one of the associated devices changes. In some implementations, one or more components such as automated assistant 106, may maintain, e.g., in memory, a running tally of smart devices and their last known statuses.

At step 410, a current user context is determined based on one or more context signals received from one or more devices of the user. The current user context may include, for example, a current location of the user, a current time that a user has submitted a request to be provided with a device summary, one or more actions of the user before requesting a device summary, and/or one or more other signals that indicate a context in which the user is requesting a device summary. For example, contextual signals may include a user requesting a device summary at 10 p.m. utilizing a device that is located in a bedroom of the user's home. The current user context may be determined that the user is preparing to go to bed based on the identified time and location of the user. In some implementations, a current user context may be determined by a component that shares one or more characteristics with context engine 115.

At step 415, one or more past user contexts that are comparable to the current user context are identified. The past user contexts may be stored in a database that shares one or more characteristics with user context database 140. For example, when a user interacts with one or more devices, such as changing the status of the device and/or requesting a status of the device, the current user context and the status change and/or interaction may be stored in user context database 140 with the current context. Subsequently, the stored interaction may be identified when the user requests a status update and is in a comparable context as the stored context (e.g., similar time of day, same location, after performing one or more other actions).

At step 420, a list of past statuses associated with the one or more identified past user contexts are identified. The list of past statuses may be identified in a database that shares one or more characteristics with user context database 140.

For example, user context database 140 may include past user contexts mapped to the statuses of one or more of the smart devices that existed at the time those contexts were recorded. In some implementations, the list of past statuses for a given user context may be identified based on similarities between the corresponding past user contexts and the current user context.

At step 425, the list of current statuses of the devices are filtered to remove one or more of the statuses. The filtering can be based on the one or more past statuses associated with the past user context of the user that is comparable to the current user context. For example, one or more statuses (and hence, smart devices) may be removed from the list based on identifying that the user has not typically changed the status of the associated device while in a past user context that is comparable to the current user context. Also, for example, one or more statuses may be removed based on identifying that the status matches the status of the device while the user was in the current context in the past (e.g., a light always has a status of "off" at night, the light is currently "off," and the user context is "night"—that status may be removed from the list).

At step 430, one or more textual snippets are generated for each of the statuses in the filtered list of statuses. A textual snippet includes information from a status of a device that has been formatted textually to be provided to a user. As an example, a status of a device may include a plurality of slots with information, such as "Name=LIGHT, Location=Kitchen, Status=ON," and the status may be converted into a textual snippet of "The kitchen light is on." The textual snippets may be generated by a component that shares one or more characteristics with text generator 125.

At step 435, a textual summary is generated based on the textual snippets. The textual summary may include extracting information from the textual snippets, generalizing information from the textual snippets to reduce the information provided in the summary, grouping one or more of the textual snippets to generalize the statuses of the group, and/or other methods of summarization that reduces the output while retaining the pertinent information. For example, textual snippets for the statuses of four lights may include "Light 1 is on," "Light 2 is on," "Light 3 is on," and "Light 4 is on." A component that shares one or more characteristics with device grouping engine 135 may identify all of the snippets as being for "light" type devices and summary generation engine 130 may generate a summary for the group of "All of the lights are on" and/or "Lights 1, 2, 3, and 4 are on." In some implementations, a count of devices may be included as a token in the summary, such as "Four lights are on" and/or "Three lights are on and one is off."

At step 440, the textual summary is provided to an output device of the user. The textual summary may be provided via audio and/or a visual display to the user. For example, a TTS module may convert a textual summary to audio and provide the audio via an automated assistant in response to the user requesting a device summary. In some implementations, the textual summary may be provided graphically, such as via a component that shares one or more characteristics with interface 107. In some implementations, the textual summary may be provided with additional information. For example, the textual summary may be provided via audio with additional information related to the statuses of the devices included in the summary and/or statuses of other devices provided graphically via interface 107. In some implementations, the additional information may include one or more control interfaces to allow the user to update the status of one or more of the devices. For example, the textual summary illustrated in FIG. 3 may be provided with control interface 302 to allow the user to update the status of one or more devices.

Figure 5:
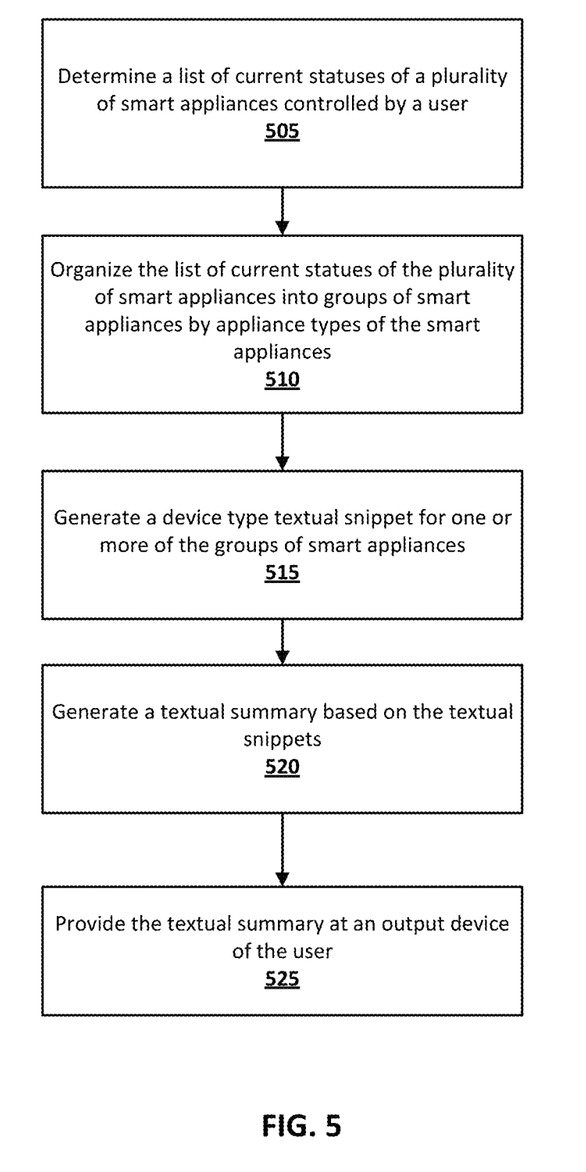
FIG. 5 illustrates another flowchart of an example method for practicing selected aspects of the present disclosure.

FIG. 5 illustrates a flowchart of an example method for providing a textual summary of the statuses of smart devices controlled by the user. The steps of FIG. 5 can be performed by one or more processors, such as one or more processors of a client device. For convenience, the operations of FIG. 5 will be described as being performed by a system. Other implementations may include additional steps than those illustrated in FIG. 5, may perform step(s) of FIG. 5 in a different order and/or in parallel, and/or may omit one or more of the steps of FIG. 5.

Blocks 505 may be substantially similar to the operations of block 405 of FIG. 4. At block 510, the system may organize the list of current statuses of the plurality of smart devices into groups by device types of the smart devices. For example, the system may organize lighting units (e.g., smart bulbs, smart light strips, smart luminaires, etc.) into one group, HVAC-related smart devices into another group, smart locks into yet another group, and so forth.

At block 515, the system may generate a device type textual snippet for one or more of the groups of smart devices organized at block 510. For example, if there are 10 smart lights total and three of them are activated, the textual snippet may be something like "Three of ten lights are on." At blocks 520 and 525, the system may generate a textual summary of the one or more device type textual snippets and provide the textual summary at an output device of one or more computing devices controlled by the user, similar to blocks 435 and 440 of FIG. 4.

Figure 6:
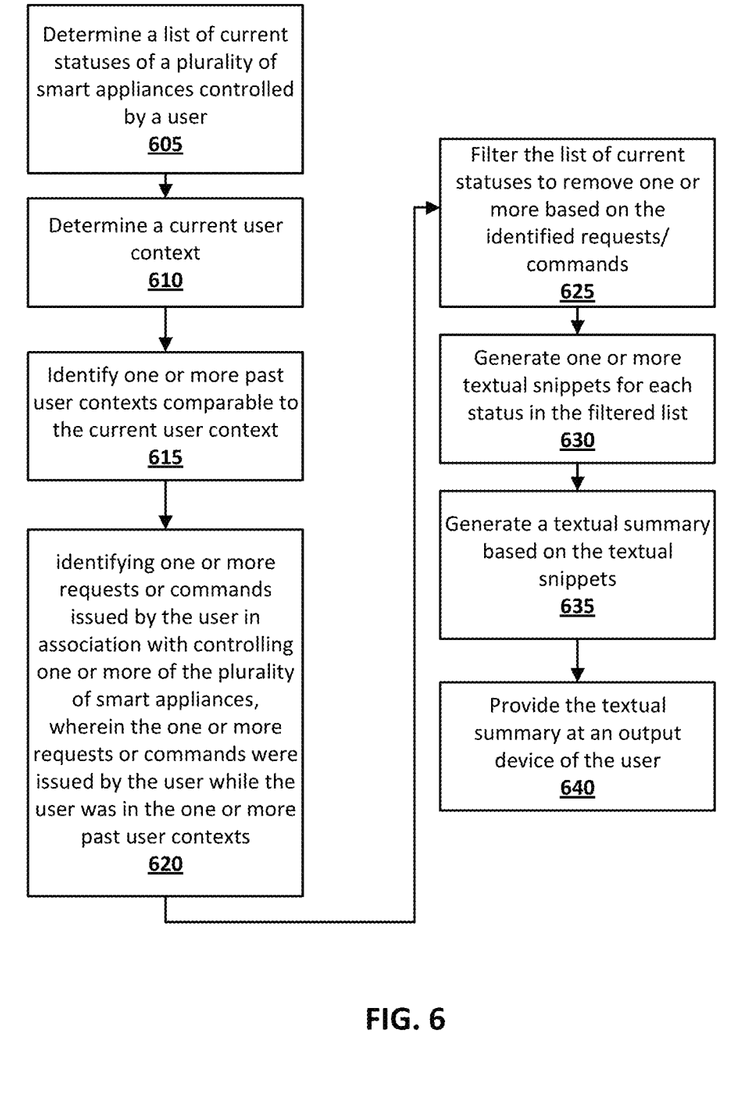
FIG. 6 illustrates yet another flowchart of an example method for practicing selected aspects of the present disclosure.

FIG. 6 illustrates a flowchart of an example method for providing a textual summary of the statuses of smart devices controlled by the user. The steps of FIG. 6 can be performed by one or more processors, such as one or more processors of a client device. For convenience, the operations of FIG. 6 will be described as being performed by a system. Other implementations may include additional steps than those illustrated in FIG. 6, may perform step(s) of FIG. 6 in a different order and/or in parallel, and/or may omit one or more of the steps of FIG. 6.

Block 605, 610, and 615 may be similar to blocks 405, 410, and 415, respectively, of FIG. 4. However, at block 620, the system may identify one or more requests or commands issued by the user in association with controlling one or more of the plurality of smart devices, wherein the one or more requests or commands were issued by the user while the user was in the one or more past user contexts. At block 625, the system may filter the list of current statuses to remove one or more of the current statuses and generate a filtered list of current statuses. In various implementations, the filtering may be based at least in part on the identified one or more requests or commands. Intuitively, the fact that these past requests/commands were issued by the user while in a comparable user context indicates that the user is more likely to have interest in the smart devices subject to these requests/commands under similar circumstances.

At block 630, the system may generate one or more textual snippets based on the filtered list of current statuses, similar to block 430 of FIG. 4. At block 635, the system may generate a textual summary of the one or more textual snippets, similar to block 435 of FIG. 4. And like block 440 of FIG. 4, at block 640, the system may provide the textual summary at an output device of one or more of the computing devices controlled by the user.

Figure 7:
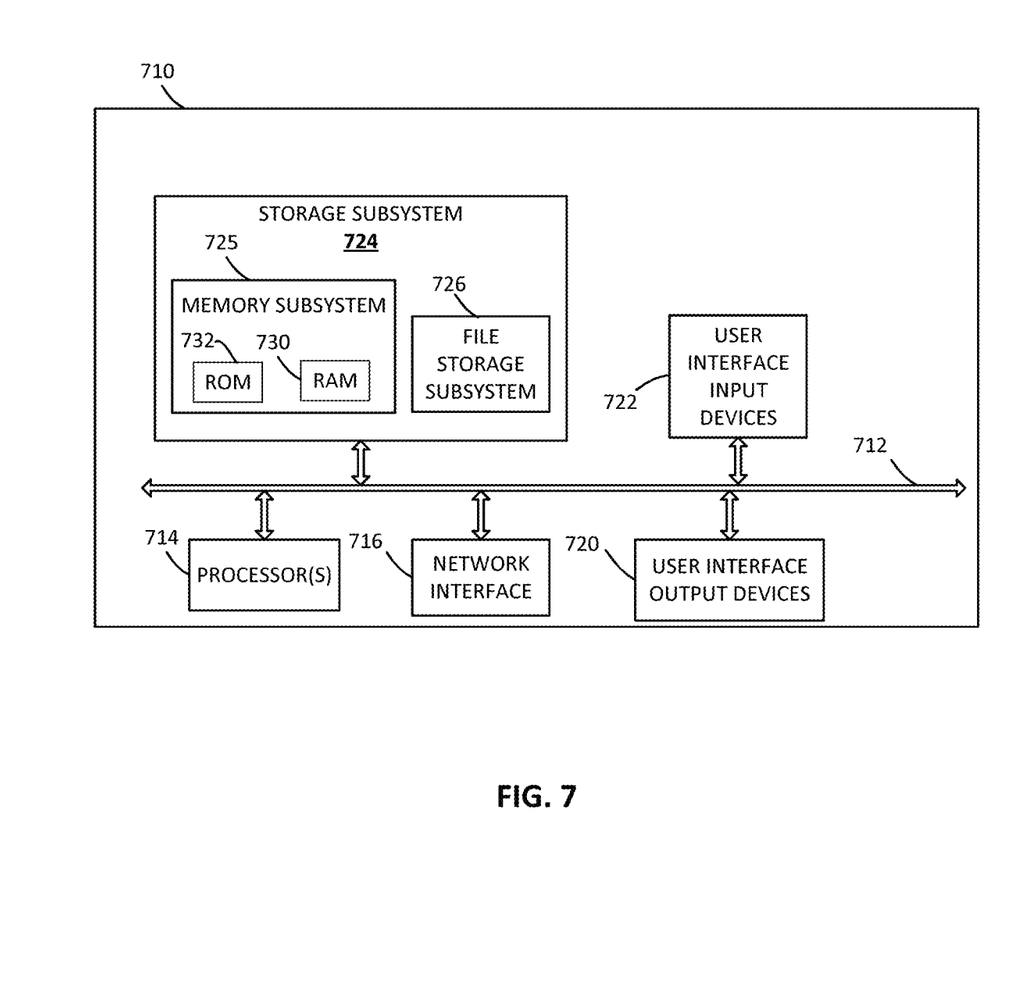
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device. Storage subsystem 724 stores programming and data constructs that provide the functionality of some or all of the modules described herein. For example, the storage subsystem 724 may include the logic to perform selected aspects of the methods described herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses. Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than those depicted in FIG. 7.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:
1. A computer implemented method, comprising:
determining a list of current statuses of a plurality of smart appliances controlled by a user;

determining a current user context based on one or more contextual signals generated by one or more computing devices controlled by the user;

identifying, from a plurality of past user contexts, one or more comparable past user contexts that are comparable to the current user context;

for each of the one or more comparable past user contexts, obtaining a corresponding list of past statuses of the plurality of smart appliances;

comparing the list of current statuses with one or more of the lists of past statuses of the plurality of smart appliances in the past user contexts;

based on the comparing, filtering the list of current statuses to remove one or more of the current statuses and generate a filtered list of current statuses;

organizing the filtered list of current statuses of the plurality of smart appliances into groups of smart appliances by device types of the plurality of smart appliances;

generating at least one device type textual snippet for one or more of the groups of smart appliances;

generating a textual summary of the at least one device type textual snippet; and providing the textual summary to an output device of one or more computing devices controlled by the user.

2. The method of claim 1, wherein the filtering comprises removing, from the list of current statuses, one or more of the current statuses that match corresponding past statuses from the list of past statuses.

3. The method of claim 1, wherein the filtered list of current statuses includes current statuses from the list of current statuses that deviate from the list of past statuses.

4. The method of claim 1, wherein one of the groups of smart appliances includes a plurality of lighting units, and the method further includes:

determining a count of lighting units of the plurality of lighting units that have a particular status, wherein generating the at least one device type textual snippet includes generating a lighting unit textual snippet that includes a plurality of tokens, wherein at least one of the plurality of tokens is the count.

5. The method of claim 1, wherein the output device provides the user with the textual summary via audio.

6. The method of claim 5, further comprising providing an audio prompt indicating one or more of the plurality of smart appliances and an offer to change the status of the indicated smart appliance.

7. The method of claim 1, further comprising:
receiving a request from the user via an input device of the one or more computing devices, wherein the input device is associated with a location, and
wherein the current user context is determined based at least in part on the location.

8. The method of claim 7, wherein filtering the list of current statuses includes filtering out one or more statuses that are associated with the location.

9. A system comprising one or more processors and memory storing instructions that, in response to execution of the instructions by the one or more processors, cause the one or more processors to perform the following operations:

determining a list of current statuses of a plurality of smart appliances controlled by a user;

determining a current user context based on one or more contextual signals generated by one or more computing devices controlled by the user;

identifying, from a plurality of past user contexts, one or more comparable past user contexts that are comparable to the current user context;

for each of the one or more comparable past user contexts, obtaining a corresponding list of past statuses of the plurality of smart appliances;

comparing the list of current statuses with one or more of the lists of past statuses of the plurality of smart appliances in the past user contexts;

based on the comparing, filtering the list of current statuses to remove one or more of the current statuses and generate a filtered list of current statuses;

organizing the filtered list of current statuses of the plurality of smart appliances into groups of smart appliances by device types of the plurality of smart appliances;

generating at least one device type textual snippet for one or more of the groups of smart appliances;

generating a textual summary of the at least one device type textual snippet; and providing the textual summary to an output device of one or more computing devices controlled by the user.

10. The system of claim 9, wherein the filtering comprises removing, from the list of current statuses, one or more of the current statuses that match corresponding past statuses from the list of past statuses.

11. The system of claim 9, wherein the filtered list of current statuses includes current statuses from the list of current statuses that deviate from the list of past statuses.

12. The system of claim 9, wherein one of the groups of smart appliances includes a plurality of lighting units, and the instructions further include:

determining a count of lighting units of the plurality of lighting units that have a particular status, wherein generating the at one device type textual snippet includes generating a lighting unit textual snippet that includes a plurality of tokens, wherein at least one of the plurality of tokens is the count.

13. The system of claim 9, wherein the output device provides the user with the textual summary via audio.

14. The system of claim 13, wherein the instructions further include:

providing an audio prompt indicating one or more of the plurality of smart appliances and an offer to change the status of the indicated smart appliance.

15. The system of claim 9, further comprising:
receiving a request from the user via an input device of the one or more computing devices, wherein the input device is associated with a location, and
wherein the current user context is determined based at least in part on the location.

16. The system of claim 15, wherein filtering the list of current statuses includes filtering out one or more statuses that are associated with the location.

17. At least one non-transitory computer-readable medium comprising instructions that, in response to execution of the instructions by one or more processors, cause the one or more processors to perform the following operations:

determining a list of current statuses of a plurality of smart appliances controlled by a user;

determining a current user context based on one or more contextual signals generated by one or more computing devices controlled by the user;

identifying, from a plurality of past user contexts, one or more comparable past user contexts that are comparable to the current user context;

for each of the one or more comparable past user contexts, obtaining a corresponding list of past statuses of the plurality of smart appliances;

comparing the list of current statuses with one or more of the lists of past statuses of the plurality of smart appliances in the past user contexts;

based on the comparing, filtering the list of current statuses to remove one or more of the current statuses and generate a filtered list of current statuses;

organizing the filtered list of current statuses of the plurality of smart appliances into groups of smart appliances by device types of the plurality of smart appliances;

generating at least one device type textual snippet for one or more of the groups of smart appliances;

generating a textual summary of the at least one device type textual snippets; and providing the textual summary to an output device of one or more computing devices controlled by the user.

18. The at least one non-transitory computer-readable medium of claim 17, wherein the filtering comprises removing, from the list of current statuses, one or more of the current statuses that match corresponding past statuses from the list of past statuses.

19. The at least one non-transitory computer-readable medium of claim 17, wherein the filtered list of current statuses includes current statuses from the list of current statuses that deviate from the list of past statuses.

20. The at least one non-transitory computer-readable medium of claim 17, wherein one of the groups of smart appliances includes a plurality of lighting units, and the instructions further cause the one or more processors to perform the following instructions:

determining a count of lighting units of the plurality of lighting units that have a particular status, wherein generating the at least one device type textual snippet includes generating a lighting unit textual snippet that includes a plurality of tokens, wherein at least one of the plurality of tokens is the count.

* * * * *